United States Patent
Malhotra et al.

(10) Patent No.: US 6,432,184 B1
(45) Date of Patent: Aug. 13, 2002

(54) INK COMPOSITIONS

(75) Inventors: Shadi L. Malhotra; Valerie M. Farrugia; Marcel P. Breton, all of Mississauga (CA)

(73) Assignee: Xerox Corporation, Stamford, CT (US)

( * ) Notice: Subject to any disclaimer, the term of this patent is extended or adjusted under 35 U.S.C. 154(b) by 54 days.

(21) Appl. No.: 09/645,851

(22) Filed: Aug. 24, 2000

(51) Int. Cl.⁷ ................................. C09D 11/00
(52) U.S. Cl. ................ 106/31.43; 106/31.75; 106/31.58; 106/31.86
(58) Field of Search ............ 106/31.43, 31.75, 106/31.58, 31.86

(56) References Cited

U.S. PATENT DOCUMENTS

| | | | |
|---|---|---|---|
| 4,490,731 A | 12/1984 | Vaught | 346/140 R |
| 4,583,036 A | 4/1986 | Morishita et al. | 320/39 |
| 4,751,528 A | 6/1988 | Spehrley, Jr. et al. | 346/140 R |
| 4,791,439 A | 12/1988 | Guiles | 346/140 R |
| 4,840,674 A | 6/1989 | Schwarz | 106/22 |
| 5,006,170 A | 4/1991 | Schwarz et al. | 106/20 |
| 5,041,161 A | 8/1991 | Cooke et al. | 106/22 |
| 5,041,849 A | 8/1991 | Quate et al. | 346/140 R |
| 5,121,141 A | 6/1992 | Hadimoglu et al. | 346/140 R |
| 5,122,187 A | 6/1992 | Schwarz et al. | 106/25 |
| 5,124,718 A | 6/1992 | Koike et al. | 346/1.1 |
| 5,667,568 A | 9/1997 | Sacripante et al. | 106/20 R |
| 5,688,312 A | 11/1997 | Sacripante et al. | 106/31.49 |
| 5,698,017 A | 12/1997 | Sacripante et al. | 106/31.49 |
| 5,698,128 A | 12/1997 | Sakai et al. | 219/745 |
| 5,700,316 A | 12/1997 | Pontes et al. | 106/31.58 |
| 5,876,492 A | 3/1999 | Malhotra et al. | 106/31.58 |
| 5,897,695 A | 4/1999 | Mayo et al. | 106/31.75 |
| 5,902,390 A | 5/1999 | Malhotra et al. | 106/31.58 |
| 5,922,117 A | 7/1999 | Malhotra et al. | 106/31.58 |
| 5,931,995 A | 8/1999 | Malhotra et al. | 106/31.58 |
| 5,958,119 A | 9/1999 | Malhotra et al. | 106/31.43 |
| 6,001,899 A | * 12/1999 | Gundlach et al. | 106/31.43 |
| 6,054,505 A | * 4/2000 | Gundlach et al. | 523/160 |
| 6,086,661 A | * 7/2000 | Malhotra et al. | 106/31.29 |
| 6,174,355 B1 | * 1/2001 | Mayo et al. | 106/31.27 |
| 6,258,873 B1 | * 7/2001 | Gundlach et al. | 106/31.43 |
| 6,264,731 B1 | * 7/2001 | Gundlach et al. | 106/31.43 |
| 6,274,645 B1 | * 8/2001 | Gundlach et al. | 106/31.43 |

* cited by examiner

*Primary Examiner*—Helene Klemanski
*Assistant Examiner*—Veronica F. Faison
(74) *Attorney, Agent, or Firm*—E. O. Palazzo

(57) ABSTRACT

An ink composition containing (1) a lighffastness compound, (2) an anticurl compound, (3) poly(diallyl dialkyl ammonium)halide, (4) colorant and (5) water.

30 Claims, No Drawings

INK COMPOSITIONS

PENDING APPLICATIONS AND PATENTS

Inks are illustrated in U.S. Pat. Nos. 5,688,312, 5,667,568, 5,700,316, 5,747,554, 5,844,020 and 5,897,695, and in copending patent applications U.S. Ser. Nos. 641,866, 935, 929, 935,889, 935,639, 933,914, 09/300,210, 09/300,193, 09/300,373, 09/300,298, 09/300,331, 09/300,333, 09/300, 332, and (09/362,673), the disclosures of each of these patents and applications being totally incorporated herein by reference.

The appropriate components and processes of the above pending applications and patents may be selected for the present invention in embodiments thereof.

BACKGROUND OF THE INVENTION

The present invention is directed to ink compositions, and more specifically, the present invention relates to aqueous inks with improved lightfastness and low curl and which inks are especially useful for ink jet processes, reference U.S. Pat. No. 5,897,695, the disclosure of which is totally incorporated herein by reference, thermal ink jet, acoustic ink printing, processes and apparatuses thereof, reference for example, the above recited copending patent applications, and U.S. Pat. Nos. 5,121,141, 5,111,220, 5,128,726, 5,371, 53, 5,528,384 and U.S. Ser. No. 176,381, the disclosures of which are totally incorporated herein by reference, including especially acoustic ink processes as illustrated in some of the aforementioned copending applications and patents, such as an acoustic ink printer for printing images on a record medium.

More specifically, the present invention is directed to ink compositions, especially aqueous inks wherein there can be generated with such inks excellent developed images with acceptable image permanence, excellent projection efficiency on transparencies, superior waterfastness characteristics, for example waterfastness values of about 95 to about 100 percent, and excellent crease resistance, and wherein the inks need not contain salts and moreover wherein the inks reduce or minimize corrosion of for example, ink jet heads. Moreover, in embodiments of the present invention, there are provided inks that enable the elimination, or minimization of undesirable paper curl. Furthermore, in embodiments of the present invention, there are provided inks that enable lightfastness and the minimization of color shift after exposure to a UV xenon-source lamp. The inks of the present invention in embodiments thereof are comprised of a vehicle, and optionally a non-colored vehicle, reference U.S. Pat. Nos. 5,688,312, 5,667, 568, 5,700,316, and 5,747,554, the disclosures of each being totally incorporated herein by reference

PRIOR ART

In acoustic ink printing, the printhead generates about 2.2 picoliter droplets by an acoustic energy process. The ink under these conditions should display a melt viscosity of about 25 centipoise or less at the jetting temperature. Furthermore, once the ink is jetted onto the paper, the ink image should be of excellent crease property, nonsmearing, waterfast, lightfastness, of excellent transparency and excellent fix qualities. In selecting an ink for such applications, it is desirable that the vehicle display a low melt viscosity, such as from about 1 centipoise to about 20, and preferably about 10 centipoise in the acoustic head.

Ink jet printing processes that utilize inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink which is melted in the apparatus will not be subject to evaporation or spillage during periods of nonprinting. The vehicle is also selected to have a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidine, which solvent has permanently dissolved therein spirit soluble dyes.

U.S. Pat. Nos. 5,006,170 and 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, and the like.

U.S. Pat. Nos. 4,853,036 and 5,124,718 disclose, for example, an ink for ink jet recording which comprises a liquid composition essentially comprising a coloring matter, a volatile solvent having a vapor pressure of 1 millimeter Hg or more at 25° C., and a solid material at room temperature.

While known ink compositions and processes are suitable for their intended purposes, a need remains for ink compositions suitable for ink jet printing. In addition, there is a need for ink compositions which are compatible with a wide variety of plain papers. Further, there is a need for aqueous ink compositions which generate high quality, waterfast images on plain papers. There is a need for aqueous ink jet ink compositions which generate high quality, lightfastness images on plain papers. Further, there is a need for ink jet ink compositions that enable the elimination, or minimization of undesirable paper curl on plain papers. There is also a need for ink jet ink compositions, which generate high quality, fast-drying images on a wide variety of plain papers at low cost, with high quality text and high quality graphics. Further, there is a need for ink jet ink compositions which exhibit minimal feathering. Additionally, there is a need for ink jet ink compositions which exhibit minimal intercolor bleed. There is also a need for hot melt ink jet ink compositions which exhibit excellent image permanence. Further, there is a need for ink jet ink compositions which are especially suitable for use in aqueous acoustic ink jet printing processes. There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided. These and other needs and advantages may be achievable with the present invention in embodiments thereof.

SUMMARY OF THE INVENTION

Examples of features of the present invention include, for example:

It is a feature of the present invention to provide ink compositions with many of the advantages illustrated herein.

It is another feature of the present invention to provide aqueous ink compositions suitable for acoustic ink jet printing.

It is yet another feature of the present invention to provide ink compositions which are compatible with a wide variety of plain papers.

It is still another feature of the present invention to provide ink compositions which generate high quality images on plain papers.

Still another feature of the present invention is to provide ink jet ink compositions which exhibit minimal intercolor bleed.

It is another feature of the present invention to provide ink jet ink compositions which exhibit excellent image permanence such as for a period of time greater than about 12 months, for example from about 14 to about 20 months.

Another feature of the present invention is to provide ink compositions suitable for ink jet printing wherein high optical densities such as greater than about 1.4 can be achieved with relatively low colorant such as dye concentrations.

Aspects of the present invention relate to an ink composition comprised of (1) a lightfastness compound, (2) an anticurl compound, (3) poly(diallyl dialkyl ammonium) halide, (4) colorant and (5) water; an ink wherein the lightfastness compound is present in an amount of from about 0.5 to about 25 percent by weight, the anticurl compound is present in an amount of from about 0.5 to about 25 percent by weight, the anticurl compound is present in an amount of from about 0.5 to about 25 percent by weight, the colorant is present in an amount of from about 0.5 to about 20 percent by weight, and water is present in an amount of from about 98 to about 5 percent by weight and wherein the total of all ink components is about 100 weight percent; an ink wherein the lightfastness compound is present in an amount of from about 0.5 to about 25 percent by weight, and is selected from the group consisting of (1) 2,6-bis(hydroxymethyl)-ρ-cresol, (2) 4-tert-amyl phenol, (3) 3-(2H-benzotriazol-2-yl)-4-hydroxyphenethylalcohol, (4)2,2-bis(4-hydroxy-3-methyl phenyl)propane, (5)bis(2-hydroxyphenyl)methane, (6) (2-endo,3-oxo)-bicyclo(2.2.2.]oct-5-ene-2,3-dimethanol,(7)1,3-dioxane-5,5-dimethanol, (8)1,4-dioxane-2,3-diol, (9) 4,8-bis(hydroxymethyl)tricyclo(5.2.1.0$^{2,6}$)decane, (10)1,4-benzenedimethanol, (11) 1,3-benzene dimethanol, (12) 1,2-benzenedimethanol, (13) 3-phenoxy-1,2-propanediol,(14) 4,4'-isopropylidene bis(2-(2,6-dibromo phenoxy)ethanol), and (15) (2,2'-(1,4-phenylenedioxy)diethanol); an ink wherein the anticurl compound is present in an amount of from about 0.5 to about 25 percent by weight, and is selected from the group consisting of (1) 2-amino-2-methyl-1,3-propanediol, (2) 2-amino-1-phenyl-1,3-propanediol, (3) 2,2-dimethyl-1-phenyl-1,3-propanediol, (4) 2-bromo-2-nitro-1,3-propanediol, (5) 3-tert-butylamino-1,2-propanediol, (6) 1,1-diphenyl-1,2-propanediol, (7) 1,4-dibromo-2, 3-butanediol, (8) 2,3-dibromo-1,4-butanediol, (9) 2,3-dibromo-2-butene-1,4-diol, (10) 1,1,2-triphenyl-1,2-ethanediol, (11) 2,2-bis(hydroxymethyl)-2,2',2"-nitrilotriethanol, (12) tris(hydroxymethyl)aminomethane succinate, (13) 4,4'-trimethylene bis(1-piperidine ethanol), (14) N-methyl-D-glucamine, (15) xylitol, (16) pantothenol, (17)2,2-thiodiethanol , and (18) 3,6-dithia-1,8-octanediol; an ink wherein the poly(diallyl dialkyl ammonium) halide is present in an amount of from about 0.5 to about 25 percent by weight is poly(diallyl diethyl ammonium)bromide and possesses a molecular weight Mw of from about 1,000 to about 3,000; an ink wherein the colorant is a dye; an ink wherein the colorant is black; an ink wherein the colorant is magenta, yellow, cyan, red, blue, green, black, or mixtures thereof; an ink containing a biocide; an ink wherein the biocide is present in an amount of from about 0.01 to about 0.25 percent by weight; a printing process which comprises incorporating into an ink jet printer an ink composition comprised of (1) a lightfastness compound, (2) an anticurl compound, (3) a poly(diallyl dialkyl ammonium) halide, (4) colorant and (5) water; and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being directed to focus with a finite waist diameter in a focal plane; and (b) causing droplets of said ink to be ejected onto a recording sheet in an imagewise pattern at an optional temperature of from about 25° C. to about 50° C.; a thermal ink jet process wherein images are developed with the inks illustrated herein; an ink wherein the poly(diallyl dialkylammonium)halide is (1) poly(diallyl dimethyl ammonium)bromide, (2) poly(diallyl diethyl ammonium) bromide, (3) poly(diallyl diheptyl ammonium)bromide, (4) poly(diallyl diheptadecyl ammonium)bromide, or (5) poly(diallyl dioctadecyl ammonium)bromide; an ink wherein the poly(diallyl dialkylammonium)halide. is poly(diallyl diethylammonium) bromide; an ink wherein the anticurl compound is 3,6-dithia-1,8-octanediol and dialkyl contains from 1 to about 15 carbon atoms; an ink wherein the lightfastness compound is present in an amount of from about 1 to about 10 percent by weight, the anticurl compound is present in an amount of from about 1 to about 10 percent by weight, the waterfast compound is present in an amount of from about 1 to about 10 percent by weight, the colorant is present in an amount of from about 1 to about 10 percent by weight, and water is present in an amount of from about 96 to about 60 percent by weight and wherein the total of all ink components is about 100 weight percent; an ink with a viscosity of from about 1.5 to about 4. cps__at about 50° C.; an ink comprised of (1) a lighffastness compound, (2) an anticurl compound, (3) a poly(diallyl dialkylammonium)halide, (4) a colorant and (5) a vehicle; an ink in the vehicle is water; an ink wherein the vehicle is a glycol; an ink wherein the vehicle optionally present in an amount of from about 98 to about 5 percent by weight is (1) 1,3-propanediol, (2) 1,2-butanediol, (3) glycerol, (4) propylene carbonate, (5) tetramethylene sulfone, (6) 2,2'-thiodiethanol, (7) 2,2'-sulfonyldiethanol, (8) di(ethyleneglycol)butylether, or (9) diethylene glycol dibutylether; an ink wherein the dialkyl contains from about 2 to about 40 carbon atoms, and wherein halide is chloride, bromide, or fluoride; an ink wherein the dialkyl contains from 2 to about 12 carbon atoms; an ink wherein the dialkyl is dethyl, dipropyl, dipentyl, diheptadecyl, or dioctadecyl; an ink wherein the poly(diallyldialkylammonium)halide is (1) poly(diallyl dimethyl ammonium)_bromide, (2) poly(diallyl diethyl ammonium)bromide, (3) poly(diallyl diheptyl ammonium)bromide, (4) poly(diallyl diheptadecyl ammonium)bromide, (5) :poly(diallyl dioctadecyl ammonium)bromide, and more specifically poly(diethyldiallyl)ammonium bromide.

The lightfastness compound is present in the ink composition in an amount of for example, from about 0.5 to about 25 percent by weight, the anticurl compound is present in an amount of for example, from about 0.5 to about 25 percent by weight, the halide(3) which can function as a waterfast component is present in an amount of for example, from about 0.5 to about 25 percent by weight, the colorant is present in an amount of, for example, from about 0.5 to about 20 percent by weight, and water is present in an amount of from about 98 to about 5 percent by weight and wherein the total of all ink components is about 100 weight percent.

In specific embodiments the lightfastness compound is present in the ink composition in an amount of from about 1 to about 10 percent by weight, the anticurl compound is present in an amount of from about 1 to about 10 percent by weight, the waterfast compound is present in an amount of from about 1 to about 10 percent by weight, the colorant is present in an amount of from about 1 to about 10 percent by weight, and water is present in an amount of from about 96 to about 60 percent by weight and wherein the total of all ink components is about 100 weight percent.

The lightfastness compound that primarily functions to protect developed images from light degradation and which compound is present in the ink in an amount of, for example, from about 0.5 to about 25 percent by weight and preferably from about 1 to about 10 percent by weight is selected, for example, from the group consisting of (1) 2,6-bis (hydroxymethyl)-ρ-cresol (Aldrich #22,752-8); (2) 4-tert-amyl phenol (Aldrich #15,384-2); (3) 3-(2H-benzotriazol-2-yl)-4-hydroxy phenethylalcohol (Aldrich #43,071-4); (4) 2,2-bis(4-hydroxy-3-methylphenyl)propane (Aldrich #42, 330-0); (5) bis(2-hydroxyphenyl)methane (Aldrich #47,611-0); (6) (2-endo,3-oxo)-bicyclo(2.2.2.]oct-5-ene-2,3-dimethanol (Aldrich #31,175-9); (7) 1,4-dioxane-2,3-diol (Aldrich #25,624-2); (8) 4,8-bis(hydroxymethyl)tricyclo(5, 2,1,0 2,6)decane (Aldrich #B4, 590-9); (9) 1,4-benzenedimethanol (Aldrich #B,300-0); (10) 1,3-benzenedimethanol (Aldrich #19,653-3); (11) 1,2-benzenedimethanol (Aldrich #18, 482-9); (12) 4,4'-isopropylidene bis(2-(2,6-dibromo phenoxy) ethanol) (Aldrich #19,443-3); (13) (2,2'-(1,4 -phenylenedioxy) diethanol) (Aldrich #23,791-4), (14) 1,3-dioxane-5,5-dimethanol, (Aldrich# 22,062-0) of the formula

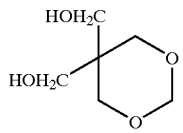

and (15) 3-phenoxy-1,2-propanediol (Aldrich # 25,781-8) with the formula

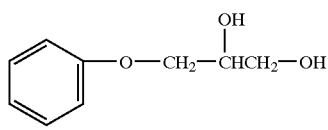

The anticurl compound that primarily prevents imaged papers from curling and present in an amount of from about 0.5 to about 25 percent by weight and preferably from about 1 to about 10 percent by weight are, for example, selected from the group consisting of (1) 2-amino-2-methyl-1,3-propanediol (Aldrich #A6,517-4); (2) 2-amino-1-phenyl-1, 3-propanediol (Aldrich #24,888-6); (3) 2,2-dimethyl-1-phenyl-1,3-propanediol, (Aldrich40,873-5); (4) 2-bromo-2-nitro-1,3-propanediol (Aldrich #13,470-8); (5) 3-tert-butylamino-1,2-propanediol (Aldrich #47, 298-0); (6) 1,1-diphenyl-1,2-propanediol, (Aldrich #36,490-8); (7) 1,4-dibromo-2,3-butanediol (Aldrich #23,757-4); (8) 2,3-dibromo-1,4-butanediol (Aldrich30,104-3); (9) 2,3-dibromo-2-butene-1,4-diol, (Aldrich #14,370-7); (10) 1,1,2-triphenyl-1,2-20 ethanediol (Aldrich #36,743-5); (11) 2,2-bis(hydroxymethyl)-2,2',2"-nitrilotriethanol (Aldrich #1;5, 666-3); (12) tris(hydroxymethyl)aminomethane succinate (Aldrich #34,068-5); (13) 4,4'-trimethylene bis(1-piperidine ethanol) (Aldrich #12,122-35); (14) N-methyl-D-glucamine (Aldrich #M4,700-0); (15) xylitol (Aldrich #85,158-2); (16) 2,2-thiodiethanol (Aldrich #16,678-2); (17) 3,6-dithia-1,8-octanediol (Aldrich #23,533-4); (18) and pantothenol (Aldrich #29,578-7) of the formula:

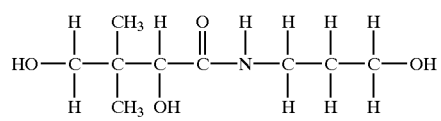

The waterfast compound present in an amount of from about 0.5 to about 25 percent by weight and preferably from about 1 to about 10 percent by weight is, for example, poly(diallyl dialkyl ammonium)halide with a weight average molecular weight $M_w$ of from about 500 to about 3,000, or from about 1,000 to about 2,000. Dialkyl contains, for example, from 1 to about 20 carbon atoms and halide is for example, chloride, bromide, fluoride, and iodide. Specific examples of poly(diallyl dialkyl ammonium)halides are (1) poly(diallyl dimethyl ammonium)chloride, (2) poly(diallyl dimethyl ammonium)bromide, (3) poly(diallyl dimethyl ammonium)iodide, (4) poly(diallyl diethyl ammonium) bromide, (5) poly(diallyl diethyl ammonium)chloride, (6) poly(diallyl diethyl ammonium)iodide, (7) poly(diallyl dihexyl ammonium)iodide, (8) poly(diallyl diheptyl ammonium)bromide, (9) poly(diallyl diheptadecyl ammonium)bromide, and (10) poly(diallyl dioctadecyl ammonium)bromide.

The ink vehicle, preferably water is present in the ink composition in an amount of, for example, from about 98 to about 5 percent by weight and preferably in an amount of from about 96 to about 60 percent by weight. Other ink vehicles that may also be selected for the inks of the present invention include (1) glycols, such as aliphatic glycols, like ethylene glycol (Aldrich #10,246-6); (2) propylene glycol (Aldrich #24,122-9); (3) 1,3-propanediol (Aldrich #P5,040-4); (4) 1,2-butanediol (Aldrich #17,765-2); (5) 1,3-butanediol (Aldrich #23,946-1); (6) 1,4-butanediol (Aldrich #24,055-9); (7) 2,3-butanediol (Aldrich #B8,490-4); (8) propylene carbonate (Aldrich #P5,265-2); (9) tetramethylene sulfone (Aldrich #T2,220-9); (10) 2,2'-thiodiethanol (Aldrich #16,678-2); (11) 2,2'-sulfonyldiethanol (Aldrich #18,008-4); (12) di(ethyleneglycol) (Aldrich #H2,645-6); (13) di(ethyleneglycol)butylether (Aldrich #11,031-0); (14) diethylene glycol dibutylether (Aldrich #20,562-1); (15) glycerol (Aldrich #13,487-21).

Examples of colorants include dyes such as BASF X-34, Projet dyes, and other acid containing dyes, which interact favorably with the polyquaternary amine salt of the present invention. Other dyes, for example direct dyes, such as Projet Cyan 1 (Direct Blue 199), react unfavorably with the polyquaternary amine salt, such that a precipitate is formed immediately upon interaction of the two materials and pigments with a black color, a cyan color, a magenta color, a yellow color, a red color, a brown color, and the like, and color gamuts. The dye may be black, cyan, magenta, yellow, red, blue, green, brown, mixtures thereof, and the like, present in the ink in an effective amount of, for example, from about 1 to about 65, and preferably from about 2 to about 20 percent by weight of the ink, and most preferably in an amount of from about 1 to about 10 weight percent. Preferred dyes are cyan and magenta dyes available from Miliken, such as cyan X17AB, and magenta REACTINT RED, X52.

Examples of suitable black dyes include various carbon blacks, such as REGAL 330®, channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, and mixtures thereof. Illustrative examples of magenta pigments include 2,9-dimethyl substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido)phthalocyanine, X-copper phthalocyanine pigment, listed in the Color Index as CI 74160, CI Pigment Blue, and Anthrathrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Neopen Blue (BASF), Sudan Blue OS (BASF), PV Fast Blue B2GO1 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other dyes may also be selected.

Pigments, that can be selected for the inks of the present include carbon blacks, like REGAL 330® available from Cabot Corporation, cyan, magenta, yellow, red, blue, green and the like pigments, which pigments are known, reference for example U.S. Pat. No. 5,556,727, the disclosure of which is totally incorporated herein by reference. The pigment amount selected is similar to the dye amount indicated herein.

Preferred pigments and dyes are Acid Blue 9, available from Tricon colors as a 10 weight percent solution, present in amount of from about 1 percent to about 3 percent, and preferably from about 2 percent to about 2.5 percent; Projet Magenta 3BOA, available from Zeneca as a 10 weight percent solution, and Acid Red 52, available from Tricon Colors as a 10 percent solution, present such that the total dye concentration is from about 1 percent to about 4 percent, and preferably from about 2 percent to about 3 percent, the dyes being present in a ratio whereby there is present from about 20 percent w/w to about 80 percent of a first dye, and preferably from about 40 percent to about 60 percent of a first dye, with a second dye and wherein the total thereof is 100 percent; Projet Yellow OAM, available from Zeneca as an 8.5 percent solution, present in an amount of from about 1 percent to about 5 percent, and preferably from about 3.5 percent to about 4.5 percent; X-34, available from BASF as a 33 percent w/w solution, Projet Fast Black 2, available from Zeneca as a 4.4 percent solution, present such that the total dye concentration is from about 1 percent to about 10 percent, and preferably from about 4 percent to about 6 percent, the dyes being present in a ratio whereby there is present from about 20 percent w/w to about 80 percent of a first dye, and preferably from about 40 percent to about 60 percent of a first dye, with a second dye and wherein the total thereof is 100 percent.

The ink vehicle is preferably water, preferably present in an amount of from about 80 to about 99 weight percent, and more preferably present in an amount of from about 95 to about 99.5 weight percent. Various types of water, such as distilled water, tap water, deionized water, and the like can be selected for the inks. Optionally the inks may contain solvents such as sulfolane, ethylene glycol, urea, diethylene glycol, formamide, dimethylformamide, and the like, in amounts of from about 0 percent to about 50 percent, and preferably from about 5 percent to about 20 percent by weight. Moreover, the inks may contain salts, such as halide salts of lithium, sodium, potassium, or divalent salts, in amounts of from about 0 percent to about 20 percent, and preferably from about 0.5 percent to about 5 percent. Additionally, the inks may contain a buffer, such as tris (hydroxymethyl)amino methane, available from Aldrich, in amounts of from about 0 percent to about 10 percent, and preferably from about 0.5 percent to about 3 percent. Moreover, the ink may contain a penetrant, for example, butyl carbitol, available from Aldrich, in amounts of from about 0 percent to about 5 percent, and preferably from about 0.5 percent to about 2 percent. Also, the inks may contain a biocide, for example, DOWICIL 200™, available from Dow Corning Company, in amounts of from about 0.01 percent to about 1 percent, and preferably from about 0.05 percent to about The ink may also contain other known ink additives as indicated herein, each present in effective amounts, such as from about 0.01 to about 5 weight percent like fillers, biocides and the like. Optional additives for further improving the jetting characteristics and the storage stability of the inks, and for preventing undesirable interactions of the inks with the printhead either during the jetting process or while the printer is idle for the inks of the present invention as illustrated herein, include humectants, such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight, and the ink. an ink wherein the biocide is present in an amount of about 0.01 to about 0.25 percent by weight.

The inks of the present invention are particularly suitable for use in aqueous acoustic ink jet printing processes. In acoustic ink jet printing, an acoustic beam exerts a radiation pressure against features upon which it impinges. Thus,: when an acoustic beam impinges on a free surface of the ink of a pool of liquid from beneath, the radiation pressure, which it exerts against the surface of the pool, may reach a sufficiently high level to release individual droplets of liquid from the pool, despite the restraining force of surface tension. Focusing the beam on or near the surface of the pool intensifies the radiation pressure it exerts for a given amount of input power. K. A. Krause, "Focusing Ink Jet Head," *IBM Technical Disclosure Bulletin,* Vol. 16, No. 4, September 1973, pages 1168 to 1170, also disclosed in U.S. Pat. No. 4,745,419, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed.

The modulation enables the radiation pressure which each of the beams exerts against the free ink surface to render brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive since it, for example, does not require nozzles or the small ejection orifices which have caused many of the reliability and pixel placement accuracy problems that conventional drop on demand and continuous stream ink jet printers have suffered. The size of the ejection orifice is an important design parameter of an ink jet since it determines the size of the droplets of ink that the jet ejects. As a result, the size of the ejection orifice should not be increased without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided so acoustic printing can be performed with a greater variety of inks than conventional ink jet printing, including inks having lower viscosities and inks containing pigments and other particulate components. Acoustic ink printers embodying printheads comprising acoustically illuminated spherical focusing lenses can print precisely positioned pixels (i.e., picture elements) at resolutions which are sufficient for high quality printing of relatively complex images. Also, the size of the individual pixels printed by such a printer can be varied over a significant range during operation, thereby accommodating, for example, the printing of variably shaded images. Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534,4,801,953, and 4,797,693, the disclosures of each of which are totally incorporated herein by reference.

In embodiments of the invention there is disclosed a printing process which comprises incorporating into an ink jet printer an ink composition comprised of (1) a lightfastness compound, (2) an anticurl compound, (3) water fast poly(diallyl dialkyl ammonium)halide, (4) a colorant and (5) water, and causing droplets of the ink to be ejected in imagewise pattern onto a substrate; a process which comprises (a) providing an acoustic ink printer having a pool of the liquid ink illustrated herein with a free surface, and a printhead including at least one droplet ejector for radiating the free surface of the ink with focused acoustic radiation to eject individual droplets of ink therefrom on demand, the radiation being directed to focus with a finite waist diameter in a focal plane, the ink comprising the components; and (b) causing droplets of the ink to be ejected onto a recording sheet in an imagewise pattern at an optional temperature of from about 25° C. to about 50° C.

The inks of the present embodiments possess a number of suitable viscosities such as for example a viscosity of from about 1 centipoise to about 5 centipoise, and more preferably from about 1 to about 2.5 centipoise at room temperature, about 22° C. The inks of the present invention also possess a range of working surface tensions, such as for example, from about 40 dynes/cm to about 60 dynes/cm, and preferably from about 45 to about 55 dynes/cm at room temperature, about 22° C.

Specific embodiments of the invention will now be described in further detail. These Examples are intended to be illustrative, and the invention is not limited to the materials, conditions, or process parameters set forth in these embodiments. All parts and percentages are by weight unless otherwise indicated.

EXAMPLE I

Cyan Ink—Improved Lightfastness

In a plastic bottle (HDPE) was added water (49.95 grams), sulfolane, (10 grams), 3-phenoxy-1,2-propanediol (4 grams), 1,3-dioxane-5,5-dimethanol (4 grams),: poly (diethyldiallyl)ammonium bromide (4 grams), potassium iodide (2 grams), and trizma premixed crystals (1.5 grams), which crystals are comprised of a mixture of tris (hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). The aforementioned components were then stirred for approximately 1 hour using a magnetic stirrer at a speed of about 250 rpm, and at room temperature, about 22° C. To the resulting mixture was added a dye solution of Acid Blue 9 (24 grams), available as a 10 w/w percent solution from Zeneca Specialties Inc. and the resulting solution was stirred a further hour under the above conditions. The ink resulting was then filtered using a cartridge filter apparatus (1 micron glass fiber filter), and the physical properties of the ink were measured. The ink was then printed using an HP1600C printer, and its print quality characteristics were measured. Prints were generated on the felt side of Xerox 4024 DP (Courtland) 18 nt and Xerox Color Xpressions 7 nt papers. A solid area print density greater than about 1.4, for example about 1.7, optical density units was measured using a Spectrolino densitometer, available from Gretag Macbeth; the lightfastness of the ink was 100 percent and ΔE (shift in the color gamut) 12 units and which lightfastness was measured as the ratio of optical densities before and after 24 hours exposure to a UV lamp (Mark V Lightfastness Test, Zenon 2500 Watt bulb). Curl was excellent at 35 millimeters, measured as the average elevation of the four corners of a print made at 100 percent area coverage with a 1 centimeter unprinted border, on a standard 8.5"×11" sheet of paper. The waterfastness values were measured at 98 percent black), 95 percent (cyan), 94 percent (magenta), 96 percent (yellow).

The ink product was comprised of water (49.95 grams), sulfolane, (10 grams), 3-phenoxy-1,2-propanediol (4 grams), 1,3-dioxane-5,5-dimethanol (4 grams), poly(diethyldiallyl)ammonium bromide (4 grams), potassium iodide (2 grams), and trizma premixed crystals (1.5 grams), which crystals are comprised of a mixture of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram) possessed a viscosity of 1.90 cPs at 25° C., as measured using a Brookfield Model DV-E viscometer with a Haake Model K20 circulating bath used to control the ink temperature during the measurement, a surface tension of 47.7 dynes/cm, at room temperature, approximately 22° C., as measured using a Kruss Model K10 Surface Tensiometer, and a pH of 8.50, as measured at room temperature, about 22° C., using an Omega Model PHB 357 pH meter.

Comparative Example I
(Control Cyan Ink)

An ink was prepared in the same manner as above, using water (49.95 grams), sulfolane, (10 grams), 2,2-thiodiethanol (12 grams), potassium iodide (2 grams), and trizma premixed crystals (1.5 grams), which crystals are comprised of a mixture of tris(hydroxymethyl)aminomethane (66.36 w/w percent), and tris (hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). This ink evidenced lower lightfastness (approximately 15 percent decrease) and higher color shift or ΔE (30 percent higher). The ink's physical properties were 8.5 for pH, 2 cps for viscosity and 50 dynes/cm for surface tension. Curl was about 20 millimeters, approximately 75 percent lower than the ink of EXAMPLE I. The waterfastness values were measured at 68 percent (black), 38 percent (cyan), 28 percent (magenta), 37 percent (yellow).

EXAMPLE II
Cyan Ink—Curl Reduction

An ink was prepared in the same manner as Example I, using water (49.95 grams), sulfolane, (10 grams), pantothenol (8 grams) poly(diethyldiallyl)ammonium bromide (4 grams), potassium iodide (2 grams), and trizma premixed crystals (1.5 grams), which crystals are comprised of a mixture of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). This ink evidenced lightfastness values around 85 percent and color shift or ΔE values of 27 units. The ink's physical properties were 8.6 for pH, 2.12 cPs for viscosity and 51.5 dynes/cm for surface tension. Curl was 0 millimeter; that is no paper curl.

Comparative Example II
(Control Cyan Ink)

An ink was prepared in the same manner as Example I, using water (49.95 grams), sulfolane, (10 grams), 2,2-thiodiethanol (8 grams), potassium iodide (2 grams), and trizma premixed crystals (1.5 grams), which crystals are comprised of a mixture of tris(hydroxymethyl)aminomethane (66.36 w/w percent), and tris (hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). This ink had lightfastness value of 85 percent (same as in Example II) but lower color shift or ΔE (70 percent lower). The ink's physical properties were 8.5 for pH, 2 cps for viscosity and 50 dynes/cm for surface tension. Curl was about 20 millimeters and which is higher than the ink of Example II.

EXAMPLE III
Cyan Ink—Curl Reduction

An ink was prepared in the same manner as Example I, using water (49.95 grams), sulfolane (10 grams), pantothenol (4 grams) and 1,3-dioxane-5,5-dimethanol (4 grams), poly(diethyldiallyl)ammonium bromide (4 grams), potassium iodide (2 grams), and trizma premixed crystals (1.5 grams), which crystals are comprised of a mixture of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). This ink evidenced lightfastness values of 80 percent and color shift or ΔE values 28 units. The ink's physical properties were 8.4 for pH, 2.02 cPs for viscosity and 51.6 dynes/cm for surface tension. Curl was 0 millimeter on 18 NT paper and 10 millimeters on 7 NT paper.

Comparative Example III
(Control Cyan Ink)

An ink was prepared in the same manner as Example I, using water (49.95 grams), sulfolane (10 grams), 2,2-thiodiethanol (10 grams), potassium iodide (4 grams), and trizma premixed crystals (1.5 grams), which crystals are comprised of a mixture of tris(hydroxymethyl)aminomethane (66.36 w/w percent), and tris (hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram) This ink evidenced higher lightfastness values as compared to the inks of Example III (8 percent higher) and lower color shift or ΔE (75 percent lower). The ink's physical properties were comparable and curl was about 20 millimeters and therefore significantly higher than the inks of Example III.

EXAMPLE IV
Magenta Ink—Improved Lightfastness

In a plastic bottle (HDPE) was added water (47.65 grams), sulfolane (10 grams), 3-phenoxy-1,2-propanediol (4 grams), 1,3-dioxane-5,5-dimethanol (4 grams), poly(diethyidiallyl)ammonium bromide (4 grams), potassium Iodide (2.5 grams), trizma premixed crystals (1.5 grams), a mixture consisting of tris(hydroxymethyl) aminomethane (66.36 w/w percent), and tris(hydroxymethyl) aminomethane hydrochloride (33.64 w/w percent), which mixture buffers the pH of the ink to a pH of approximately 8.5 pH units butyl carbitol (0.3 gram), and DOWICIL$_{200}$TM (0.05 gram). The above reagents were then stirred for approximately 1 hour using a magnetic stirrer at a speed of about 250 rpm, and at room temperature, about 22° C. To this mixture was added a dye solution Projet Magenta 3BOA (13.0 grams), available as a 10 w/w percent solution from Zeneca Specialties Inc. and Acid Red 52 (13.0 grams) available as a 10 w/w percent solution from Tricon Colors Inc., and the resulting solution stirred a further hour under the above conditions. The ink was then filtered using a cartridge filter apparatus (1 micron glass fiber filter), and its physical properties measured. The ink was then printed using an HP1600C printer, and its print quality characteristics measured. Prints were generated on the felt side of Xerox 4024 DP (Courtland) 18 nt and Xerox Color Xpressions 7 nt papers. A solid area print density greater than about 1.3 optical density units, for example 1.4, was measured using a Spectrolino densitometer, available from Gretag Macbeth. Lightfastness of the ink was greater than 95 percent, about 97 percent for example, and ΔE was 8 units, and was measured as the ratio of optical densities before and after 24 hours exposure to a UV lamp (Mark V Lightfastness Test, Zenon 2500 Watt bulb). Curl was found to be 30 millimeters, measured as the average elevation of the four corners of a print generated at 100 percent area coverage with a 1 centimeter unprinted border, on a standard 8.5"×11" sheet of paper.

The ink product was comprised of water (47.65 grams), sulfolane, (10 grams), 3-phenoxy-1,2-propanediol (4 grams), 1,3-dioxane-5,5-dimethanol (4 grams), poly(diethyldiallyl)ammonium bromide (4 grams), potassium Iodide (2.5 grams), trizma premixed crystals (1.5 grams), a mixture of tris(hydroxymethyl) aminomethane (66.36 w/w percent), and tris(hydroxymethyl)aminomethane hydrochloride (33.64 w/w percent), which mixture buffers the pH of the ink to a pH of approximately 8.5 pH units butyl carbitol (0.3 gram), and DOWICIL 200™ (0.05 gram) had a viscosity of 1.99 cPs, at 25° C., as measured using a Brookfield Model DV-E viscometer with a Haake Model K20 circulating bath used to control the ink temperature during the measurement, a surface tension of 47.9 dynes/cm, as measured using a Kruss Model K10 Surface Tensiometer, and a pH of 8.51, as measured at room temperature, about 22° C., using an Omega Model PHB 357 pH meter.

Comparative Example IV
(Control Magenta Ink)

An ink was prepared in the same manner as Example IV using potassium Iodide (2.5 grams), trizma premixed crystals (1.5 grams), a mixture consisting of tris(hydroxymethyl) aminomethane (66.36 w/w percent), and tris(hydroxymethyl)aminomethane hydrochloride (33.64 w/w percent), which mixture buffers the pH of the ink to a pH of approximately 8.5 pH units butyl carbitol (0.3 gram), and DOWICIL 200™ (0.05 gram). This ink evidenced a low lightfastness (approximately 7 percent decrease) and higher color shift or ΔE (2 times higher). The ink's physical properties were 8.58 for pH, 1.99 cPs for viscosity and 50.7 dynes/cm for surface tension. Curl was about 20 millimeters.

EXAMPLE V
Magenta Ink—Curl Reduction

An ink was prepared in the same manner as Example IV, using water (47.65 grams), sulfolane, (10 grams), pantothenol (8 grams), poly(diethyldiallyl)ammonium bromide (4 grams), potassium Iodide (2.5 grams), trizma premixed crystals (1.5 grams), a mixture consisting of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units butyl carbitol (0.3 gram), and DOWICIL 200™ (0.05 gram). This ink evidenced lightfastness values of about 90 percent and color shift or ΔE values of 20 units. The ink's physical properties were 8.51 for pH, 2.02 cPs for viscosity and 50.1 dynes/cm for surface tension. Curl was 0 millimeter on 18 nt paper and 5 millimeters on 7 nt paper.

Comparative Example V
(Control Magenta Ink)

An ink was prepared in the same manner as Example IV, using water (47.65 grams), sulfolane, (10 grams), 2,2-thiodiethanol (12 grams), potassium Iodide (2.5 grams), trizma premixed crystals (1.5 grams), a mixture consisting of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.3 gram), and DOWICIL 200™ (0.05 gram). This ink evidenced comparable lightfastness values to Example VI and lower color shift or ΔE (10 percent lower). The ink's physical properties were 8.58 for pH, 1.99 cPs for viscosity and 50.7 dynes/cm for surface tension. Curl was about 20 millimeters and therefore higher than the inks of Example II.

EXAMPLE VI
Magenta Ink—Curl Reduction

An ink was prepared in the same manner as Example IV, using water (47.65 grams), sulfolane, (10 grams), pantothenol (4 grams) and 1,3-dioxane-5,5-dimethanol (4 grams), poly(diethyldiallyl)ammonium bromide (4 grams), potassium Iodide (2.5 grams), trizma premixed crystals (1.5 grams), a mixture consisting of tris(hydroxymethyl) aminomethane (66.36 w/w percent), and tris(hydroxymethyl)aminomethane hydrochloride (33.64 w/w percent), which mixture buffers the pH of the ink to a pH of approximately 8.5 pH units butyl carbitol (0.3 gram), and DOWICIL 200™ (0.05 gram). This ink evidenced lightfastness values around 85 percent and color shift or ΔE values around 20 units. The ink's physical properties were 8.49 for pH, 2.01 cPs for viscosity and 50.2 dynes/cm for surface tension. Curl was 0 millimeter on 18 NT and 6 millimeters on 7 NT papers.

Comparative Example VI
(Control Magenta Ink)

An ink was prepared in the same manner as Example IV, using water (47.65 grams), sulfolane, (10 grams), 2,2- thiodiethanol (8 grams), potassium Iodide (2.5 grams), trizma premixed crystals (1.5 grams), a mixture consisting of tris(hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units butyl carbitol (0.3 gram), and DOWICIL 200™ (0.05 gram). This ink evidenced higher lightfastness values as compared for the inks of Example VII (9 percent higher) and lower color shift or ΔE (10 percent lower). The ink's physical properties were a 8.58 pH, 1.99 cPs for viscosity and 50.7 dynes/cm for surface tension. Curl was about 20 millimeters and therefore significantly higher than the inks of Example VI.

EXAMPLE VII
Yellow Ink—Improved Lightfastness

In a plastic bottle (HDPE) was added water (35.7 grams), sulfolane (5 grams), 3-phenoxy-1,2-propanediol (4 grams), 1,3-dioxane-5,5-dimethanol (4 grams), poly(diethyldiallyl) ammonium bromide (4 grams), trizma premixed crystals (1.5 grams), butyl carbitol (0.75 gram), and DOWICIL 200™ (0.05 grams). The above components were then stirred for approximately 1 hour using a magnetic stirrer at a speed of about 250 rpm, and at room temperature, about 22° C. To this mixture was added the dye solution Projet Yellow OAM (45 grams), available as an 8.5 w/w percent solution from Zeneca Specialties Inc. and the resulting solution was stirred a further hour under the above same conditions. The ink was then filtered using a cartridge filter apparatus (1 micron glass fiber filter), and its physical properties measured. The ink was then printed using an HP1600C printer, and its print quality characteristics were measured. Prints were generated on the felt side of Xerox 4024 DP (Courtland) 18nt and Xerox Color Xpressions 7nt papers. A solid area print density greater than 1.1 optical density units, such as 1.3, was measured using a Spectrolino densitometer, available from Gretag Macbeth. The lightfastness of the above ink was about 98 percent and ΔE was 3 units, as measured as the ratio of optical densities before and after 24 hours exposure to a UV lamp (Mark V Lightfastness Test, Zenon 2500 Watt bulb). Curl was found to be 25 millimeters, measured as the average elevation of the four corners of a print generated at 100 percent area coverage with a 1 centimeter unprinted border, on a standard 8.5"×11" sheet of paper.

The ink product was comprised of water (35.7 grams), sulfolane (5 grams), 3-phenoxy-1,2-propanediol (4 grams), 1,3-dioxane-5,5-dimethanol (4 grams), poly(diethyidiallyl) ammonium bromide (4 grams), trizma premixed crystals (1.5 grams), butyl carbitol (0.75 gram), and DOWICIL 200™ (0.05 gram), had a viscosity of 1.93 cPs, at 25° C., as measured using a Brookfield Model DV-E viscometer with a Haake Model K20 circulating bath used to control the ink temperature during the measurement, a surface tension of 49 dynes/cm, as measured using a Kruss Model K10 Surface Tensiometer, and a pH of 8.46, as measured at room temperature, about 22° C., using an Omega Model PHB 357 pH meter.

Comparative Example VII
(Control Yellow Ink)

An ink was prepared in the same manner as Example VII water (35.7 grams), sulfolane (5 grams), 2,2-thiodiethanol (zero grams), poly(diethyldiallyl)ammonium bromide (4 grams), trizma premixed crystals (1.5 grams), butyl carbitol (0.75 gram), and DOWICIL 200™ (0.05 grams). As compared to the yellow ink of Example VII, this ink evidenced lower lightfastness (approximately 10 percent decrease) and higher color shift or ΔE (4 times higher). The ink's physical properties were 8.45 for pH, 1.94 cPs for viscosity and 50.4 dynes/cm for surface tension. Curl was about 20 millimeters.

EXAMPLE VIII
Yellow Ink—Curl Reduction

An ink was prepared in the same manner as Example VII, using water (35.7 grams), sulfolane (5 grams), pantothenol (8 grams) poly(diethyidiallyl)ammonium bromide (4 grams), trizma premixed crystals (1.5 grams), butyl carbitol (0.75 gram), and DOWICIL 200™ (0.05 grams). This ink evidenced lightfastness values of about 92 percent and a color shift or ΔE values of 15 units. The ink's physical properties were 8.51 for pH, 1.99 cPs for viscosity and 50.1 dynes/cm for surface tension. Curl was 0 millimeter on 18 nt paper and 6 millimeters on 7 nt paper.

Comparative Example VIII
(Control Yellow Ink)

An ink was prepared in the same manner as Example VII, using water (35.7 grams), sulfolane (5 grams), 2,2-thiodiethanol (8 grams), poly(diethyldiallyl) ammonium bromide (zero grams), trizma premixed crystals (1.5 grams), butyl carbitol (0.75 gram), and DOWICIL 200™ (0.05 gram). This ink evidenced comparable lightfastness values the inks of Example VIII and lower color shift or ΔE (20 percent lower). The ink's physical properties were 8.45 for pH, 1.94 cPs for viscosity and 50.4 dynes/cm for surface tension. Curl was about 20 millimeters and therefore much higher than the inks of Example VIII.

EXAMPLE IX
Yellow Ink—Curl Reduction

An ink was: prepared in the same manner as Example VII, using water (35.7 grams), sulfolane (5 grams), pantothenol (4 grams) and 1,3-dioxane-5,5-dimethanol (4 grams), poly (diethyldiallyl)ammonium bromide (4 grams), trizma premixed crystals (1.5 grams), butyl carbitol (0.75 gram), and DOWICIL 200™ (0.05 grams). This ink evidenced lightfastness values of about 88 percent and color shift or ΔE values of about 16 units. The ink's physical properties were 8.52 for pH, 2.01 cPs for viscosity and 50.0 dynes/cm for surface tension. Curl was 0 millimeter on 18 NT and 8 millimeters on 7 NT papers.

Comparative Example IX
(Control Yellow Ink)

An ink was prepared in the same manner as Example VII, using water (35.7 grams), sulfolane (5 grams), 2,2-thiodiethanol (8 grams), trizma premixed crystals (1.5 grams), butyl carbitol (0.75 gram), and DOWICIL 200™ (0.05 grams). This ink evidenced higher lightfastness values as compared to the inks of Example IX (3 percent higher) and lower color shift or ΔE (25 percent lower). The ink's physical properties were 8.45 for pH, 1.94 cPs for viscosity and 50.4 dynes/cm for surface tension. Curl was much higher than the inks of Example IX.

EXAMPLE X
Black Ink—Improved Lightfastness

In a plastic bottle (HDPE) was added water (31.23 grams), sulfolane, (20 grams), 3-phenoxy-1,2-propanediol (4 grams), 1,3-dioxane-5,5-dimethanol (4 grams),: poly (diethyldiallyl)ammonium bromide (4 grams), potassium Iodide (2 grams), trizma premixed crystals (2 grams) of the above Example III, butyl carbitol (0.25 gram), and DOWICIL 200™ (0.05 gram). The above reagents were then stirred for approximately 1 hour using a magnetic stirrer at a speed of about 250 rpm, and at room temperature, about 22° C. To this mixture was added the dye solutions, BASF X-34, available as a 33.2 percent (w/w) solution from BASF (10.57 grams), and Projet Fast Black 2, available from Zeneca as a 4.4 percent solution (21.9 grams), and the resulting solution was stirred a further hour under the above same conditions. The ink was then filtered using a cartridge filter apparatus (1 micron glass fiber filter), and its physical properties measured. The ink was then printed using an HP1600C printer, and its print quality characteristics measured. Prints were generated on the felt side of Xerox 4024 DP (Courtland) 18 nt and Xerox Color Xpressions 7 nt papers. A solid area print density greater than 1.4 optical density units, for example about 1.6, was measured using a Spectrolino densitometer, available from Gretag Macbeth. The lightfastness of the above inks was 100 percent and ΔE was 4 units, as measured as the ratio of optical densities before and after 24 hours exposure to a UV lamp (Mark V Lightfastness Test, Zenon 2500 Watt bulb). Curl was found to be 35 millimeters, measured as the average elevation of the four corners of a print made at 100 percent area coverage with a 1 centimeter unprinted border, on a standard 8.5"×11" sheet of paper.

The ink product was comprised of water (31.23 grams), sulfolane, (20 grams), 3-phenoxy-1,2-propanediol (4 grams), 1,3-dioxane-5,5-dimethanol (4 grams), poly (diethyldiallyl)ammonium bromide (4 grams), potassium Iodide (2 grams), trizma premixed crystals (2 grams) of the above Example III, butyl carbitol (0.25 gram), and DOWICIL 200™ (0.05 gram). was found to have a viscosity of 2.05 cPs, at 25° C., as measured using a Brookfield Model DV-E viscometer with a Haake Model K20 circulating bath used to control the ink temperature during the measurement, a surface tension of 51.3 dynes/cm, as measured using a Kruss Model K10 Surface Tensiometer, and a pH of 8.38, as measured at room temperature, about 22° C., using an Omega Model PHB 357 pH meter.

Comparative Example X
(Control Black Ink)

An ink was prepared in the same manner as Example X above, using water (39.23 grams), sulfolane, (20 grams), potassium Iodide (2 grams), trizma premixed crystals (2 grams) of the above Example m, butyl carbitol (0.25 gram), and DOWICIL 200™ (0.05 gram). This ink evidenced lower lightfastness (approximately 4 percent decrease) and higher color shift or ΔE (60 percent higher) compared to ink of the Example X. The ink's physical properties were 8.35 for pH, 2.05 cPs for viscosity and 50.4 dynes/cm for surface tension. Curl was about 50 millimeters about 30 percent higher than the inks of EXAMPLE X.

EXAMPLE XI
Black Ink—Curl Reduction

An ink was prepared in the same manner as Example X, using water (31.23 grams), sulfolane, (20 grams), pantothenol (8 grams), poly(diethyldiallyl)ammonium bromide (4 grams), potassium Iodide (2 grams), trizma premixed crystals (2 grams) of the above Example III, butyl carbitol (0.25 gram), and DOWICIL 200™ (0.05 gram). This ink evidenced lightfastness values of about 96 percent and color shift or ΔE values of 12 units. The ink's physical properties were 8.45 for pH, 2.00 cPs for viscosity and 50.6 dynes/cm for surface tension. Curl was 20 millimeters on both 18 NT and 7 NT papers.

Comparative Example XI
(Control Black Ink)

An ink was prepared in the same manner as Example X above, using water (39.23 grams), sulfolane (20 grams), potassium Iodide (2 grams), trizma premixed crystals (2 grams) of the above Example III, butyl carbitol (0.25 gram), and DOWICIL 200™ (0.05 gram). This ink evidenced comparable lightfastness values to the inks of Example XI and lower color shift or ΔE (17 percent lower). The ink's physical properties were 8.35 for pH, 2.05 cPs for viscosity and 50.4 dynes/cm for surface tension. Curl was about 50 millimeters (2.5 times higher than the inks of Example XI)

EXAMPLE XII
Black Ink—Curl Reduction

An ink was prepared in the same manner as Example X, using water (31.23 grams), sulfolane (20 grams), pantothenol (4 grams) and 1,3-dioxane-5,5-dimethanol (4 grams), poly(diethyldiallyl)ammonium bromide (4.0 grams), potassium Iodide (2 grams), trizma premixed crystals (2 grams) of the above Example III, butyl carbitol (0.25 gram), and DOWICIL 200™ (0.05 gram). This ink evidenced lightfastness values of about 90 percent and color shift or ΔE values around 15 units. The ink's physical properties were 8.51 for pH, 2.04 cPs for viscosity and 50.2 dynes/cm for surface tension. Curl was 15 millimeters on 18 NT and 25 millimeters on 7 NT papers.

Comparative Example XII
(Control Black Ink)

An ink was prepared in the same manner as Example X, using water (39.23 grams), sulfolane, (20 grams), potassium Iodide (2 grams), trizma premixed crystals (2 grams) of the above Example III, butyl carbitol (0.25 gram), and DOWICIL 200™ (0.05 gram). This ink evidenced higher lightfastness values as compared to the ink of Example XII (6 percent higher) and lower color shift or ΔE (33 percent lower). The ink's physical properties were 8.35 for pH, 2.05 cPs for viscosity and 50.4 dynes/cm for surface tension. Curl was about 50 millimeters and therefore significantly higher than Example XII.

Other embodiments and modifications of the present invention may occur to those of ordinary skill in the art subsequent to a review of the present application and the information presented herein; these embodiments, modifications, and equivalents, or substantial equivalents thereof, are also included within the scope of the present invention.

What is claimed is:

1. An ink composition comprised of (1) a lightfastness compound, (2) an anticurl compound, (3) poly(diallyl dialkyl ammonium)halide, (4) colorant and (5) water.

2. An ink in accordance with claim 1 wherein the lightfastness compound is present in an amount of from about 0.5 to about 25 percent by weight, the anticurl compound is present in an amount of from about 0.5 to about 25 percent by weight, the poly(diallyl dialkyl ammonium)halide is present in an amount of from about 0.5 to about 25 percent by weight, the colorant is present in an amount of from about 0.5 to about 20 percent by weight, and water is present in an amount of from about 98 to about 5 percent by weight and wherein the total of all ink components is about 100 weight percent.

3. An ink in accordance with claim 1 wherein the lightfastness compound is present in an amount of from about 0.5 to about 25 percent by weight, and is selected from the group consisting of (1) 2,6-bis(hydroxymethyl)-ρ-cresol, (2) 4-tert-amyl phenol, (3) 3-(2H-benzotriazol-2-yl)-4-hydroxyphenethylalcohol,(4)2,2-bis(4-hydroxy-3-methyl phenyl)propane, (5)bis(2-hydroxyphenyl)methane, (6)

(2-endo,3-oxo)-bicyclo(2.2.2.]oct-5-ene-2,3-dimethanol,(7) 1,3-dioxane-5,5-dimethanol, (8)1,4-dioxane-2,3-diol, (9) 4,8-bis(hydroxymethyl)tricyclo(5.2.1.0$^{2,6}$)decane, (10)1,4-benzenedimethanol, (11) 1,3-benzene dimethanol, (12) 1,2-benzenedimethanol, (13) 3-phenoxy-1,2-propanediol,(14) 4,4'-isopropylidene bis(2-(2,6-dibromo phenoxy)ethanol), and (15) (2,2'-(1,4-phenylenedioxy)diethanol).

4. An ink in accordance with claim 1 wherein the anticurl compound is present in an amount of from about 0.5 to about 25 percent by weight, and is selected from the group consisting of (1) 2-amino-2-methyl-1,3-propanediol, (2) 2-amino-1-phenyl-1,3-propanediol, (3) 2,2-dimethyl-1-phenyl-1,3-propanediol, (4) 2-bromo-2-nitro-1,3-propanediol, (5) 3-tert-butylamino-1,2-propanediol, (6) 1,1-diphenyl-1,2-propanediol, (7) 1,4-dibromo-2,3-butanediol, (8) 2,3-dibromo-1,4-butanediol, (9) 2,3-dibromo-2-butene-1,4-diol, (10) 1,1,2-triphenyl-1,2-ethanediol, (11) 2,2-bis (hydroxymethyl)-2,2',2"-nitrilotriethanol, (12) tris (hydroxymethyl)aminomethane succinate, (13) 4,4'-trimethylene bis(1-piperidine ethanol), (14) N-methyl-D-glucamine, (15) xylitol, (16) pantothenol, (17)2,2-thiodiethanol , and (18) 3,6-dithia-1,8-octanediol.

5. An ink in accordance with claim 1 wherein said poly(diallyl dialkyl ammonium)halide is present in an amount of from about 0.5 to about 25 percent by weight and is poly(diallyl diethyl ammonium)bromide and possesses a molecular weight $M_w$ of from about 1,000 to about 3,000.

6. An ink in accordance with claim 1 wherein the colorant is a dye.

7. An ink in accordance with claim 1 wherein the colorant is black.

8. An ink in accordance with claim 1 wherein the colorant is magenta, yellow, cyan, red, blue, green, black, or mixtures thereof.

9. An ink in accordance with claim 1 containing a biocide.

10. An ink in accordance with claim 9 wherein the biocide is present in an amount of from about 0.01 to about 0.25 percent by weight.

11. A printing process which comprises incorporating into an ink jet printer an ink composition comprised of (1) a lightfastness compound, (2) an anticurl compound, (3) a poly(diallyl dialkyl ammonium)halide, (4) colorant and (5) water; and causing droplets of the ink to be ejected in imagewise pattern onto a substrate.

12. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being directed to focus with a finite waist diameter in a focal plane, said ink comprising the components of claim 1; and (b) causing droplets of said ink to be ejected onto a recording sheet in an imagewise pattern at an optional temperature of from about 25° C. to about 50° C.

13. A thermal ink jet process wherein images are developed with the ink of claim 1.

14. An ink in accordance with claim 1 wherein said poly(diallyl dialkylammonium)halide is (1) poly(diallyl dimethyl ammonium)bromide, (2) poly(diallyl diethyl ammonium)bromide, (3) poly(diallyl diheptyl ammonium) bromide, (4) poly(diallyl diheptadecyl ammonium)bromide, or (5) poly(diallyl dioctadecyl ammonium)bromide.

15. An ink in accordance with claim 1 wherein said poly(diallyl dialkylammonium)halide is poly(diallyl diethylammonium)bromide.

16. An ink in accordance with claim 1 wherein the anticurl compound is 3,6-dithia-1,8-octanediol and said dialkyl contains from 1 to about 15 carbon atoms.

17. An ink in accordance with claim 1 wherein the lightfastness compound is present in an amount of from about 1 to about 10 percent by weight, the anticurl compound is present in an amount of from about 1 to about 10 percent by weight, the poly(diallyl dialkyl ammonium) halide is present in an amount of from about 1 to about 10 percent by weight, the colorant is present in an amount of from about 1 to about 10 percent by weight, and water is present in an amount of from about 96 to about 60 percent by weight and wherein the total of all ink components is about 100 weight percent.

18. An ink in accordance with claim 1 with a viscosity of from about 1.5 to about 4 cps at about 50° C., a curl value of from about zero to about 10 mm, a lightfastness value of from about 85 to about 100 percent and a waterfastness value of from about 95 to about 99 percent.

19. An ink comprised of (1) a lightfastness compound, (2) an anticurl compound, (3) a poly(diallyl dialkylammonium) halide, (4) a colorant and (5) a vehicle.

20. An ink in accordance with claim 19 wherein said vehicle is water.

21. An ink in accordance with claim 19 wherein said vehicle is a glycol.

22. An ink in accordance with claim 19 wherein said vehicle is present in an amount of from about 98 to about 5 percent by weight and which vehicle is (1) 1,3-propanediol, (2) 1,2-butanediol, (3) glycerol, (4) propylene carbonate, (5) tetramethylene sulfone, (6) 2,2'-thiodiethanol, (7) 2,2'-sulfonyldiethanol, (8) di(ethyleneglycol)butylether, or (9) diethylene glycol dibutylether.

23. An ink in accordance with claim 19 wherein said dialkyl contains from about 2 to about 40 carbon atoms, and wherein halide is chloride, bromide, or fluoride.

24. An ink in accordance with claim 19 wherein said dialkyl contains from 2 to about 12 carbon atoms.

25. An ink in accordance with claim 19 wherein said dialkyl is diethyl, dipropyl, dipentyl, diheptadecyl, or dioctadecyl.

26. An ink in accordance with claim 19 wherein said poly(diallyldialkylammonium)halide is (1) poly(diallyl dimethyl ammonium)bromide, (2) poly(diallyl diethyl ammonium)bromide, (3) poly(diallyl diheptyl ammonium) bromide, (4) poly(diallyl diheptadecyl ammonium)bromide, (5) poly(diallyl dioctadecyl ammonium)bromide, with poly (diethyldiallyl)ammonium bromide being preferred.

27. An ink composition consisting of (1) a lightfastness compound, (2) an anticurl compound, (3) poly(diallyl dialkyl ammonium)halide, (4) colorant and (5) water.

28. An ink composition comprised of (1) a lightfastness compound, (2) an anticurl compound, (3) poly(diallyl dialkyl ammonium)halide, (4) colorant and (5) water, and wherein the lightfastness compound is present in an amount of from about 0.5 to about 25 percent by weight, and is selected from the group consisting of (1) 2,6-bis (hydroxymethyl)-ρ-cresol, (2) 4-tert-amyl phenol, (3) 3-(2H-benzotriazol-2-yl)-4-hydroxyphenethyl alcohol, (4) 2,2-bis(4-hydroxy-3-methyl phenyl)propane, (5) bis(2-hydroxyphenyl)methane, (6) (2-endo,3-oxo)-bicyclo(2.2.2.] oct-5-ene-2,3-dimethanol, (7) 1,3-dioxane-5,5-dimethanol, (8) 1,4-dioxane-2,3-diol, (9) 4,8-bis(hydroxymethyl)tricyclo (5.2.1.0$^{2,6}$)decane, (10) 1,4-benzenedimethanol, (11) 1,3-benzene dimethanol, (12) 1,2-benzenedimethanol, (13) 3-phenoxy-1,2-propanediol, (14) 4,4'-isopropylidene bis(2-(2,6-dibromo phenoxy)ethanol), and (15) (2,2'-(1,4-phenylenedioxy) diethanol).

29. An ink composition comprised of (1) a lightfastness compound, (2) an anticurl compound, (3) poly(diallyl dialkyl ammonium)halide, (4) colorant and (5) water, and wherein the anticurl compound is present in an amount of from about 0.5 to about 25 percent by weight, and is selected from the group consisting of (1) 2-amino-2-methyl-1,3-propanediol, (2) 2-amino-1-phenyl-1,3-propanediol, (3) 2,2-dimethyl-1-phenyl-1,3-propanediol, (4) 2-bromo-2-nitro-1,3-propanediol, (5) 3-tert-butylamino-1,2-propanediol, (6) 1,1-diphenyl-1,2-propanediol, (7) 1,4-dibromo-2,3-butanediol, (8) 2,3-dibromo-1,4-butanediol, (9) 2,3-dibromo-2-butene-1,4-diol, (10) 1,1,2-triphenyl-1,2-ethanediol, (11) 2,2-bis(hydroxymethyl)-2,2',2"-nitrilotriethanol, (12) tris(hydroxymethyl)aminomethane succinate, (13) 4,4'-trimethylene bis(1-piperidine ethanol), (14) N-methyl-D-glucamine, (15) xylitol, (16) pantothenol, (17) 2,2-thiodiethanol, and (18) 3,6-dithia-1,8-octanediol.

30. An ink composition comprised of (1) a lightfastness compound, (2) an anticurl compound, (3) poly(diallyl dialkyl ammonium)halide, (4) colorant and (5) water, and wherein the anticurl compound is 3,6-dithia-1,8-octanediol and said dialkyl contains from 1 to about 15 carbon atoms.

* * * * *